Patented Nov. 29, 1949

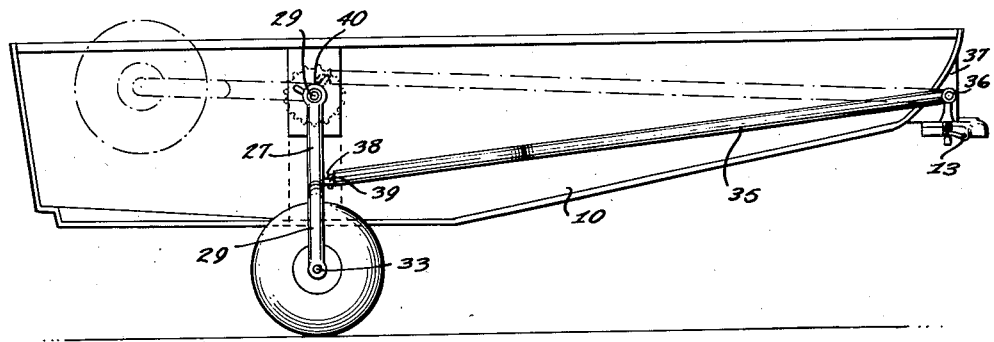
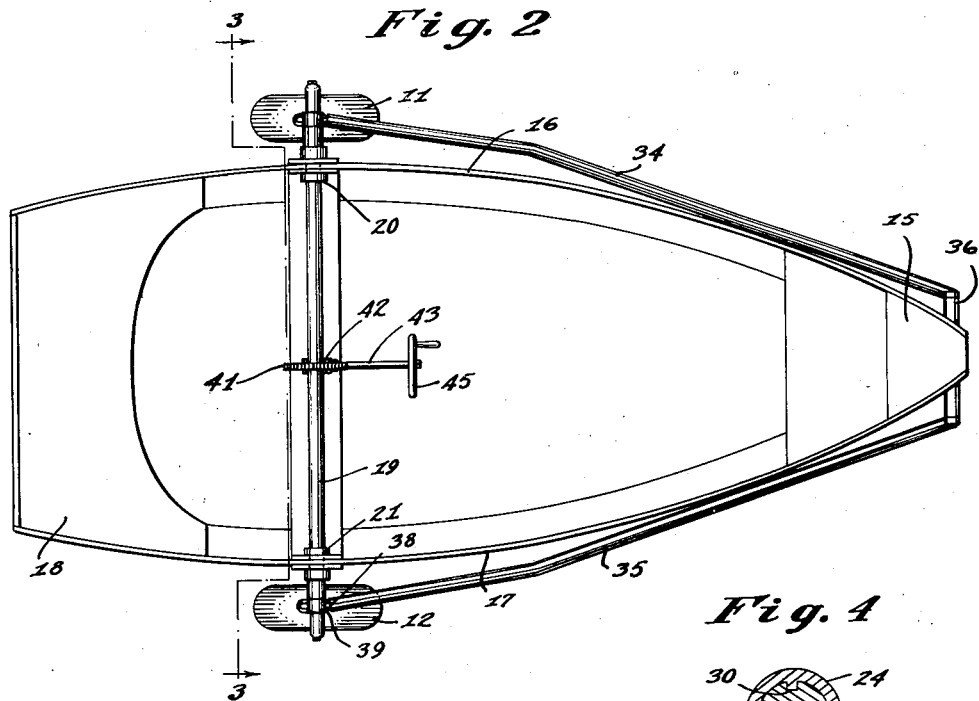
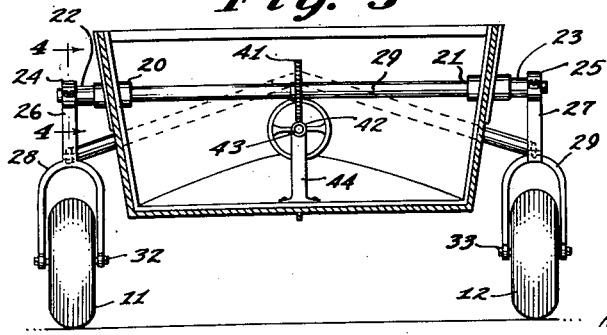
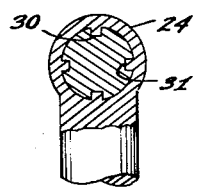

2,489,414

UNITED STATES PATENT OFFICE 2,489,414

BOAT TRAILER

Luther A. Holmes, New Hartford, N. Y.

Application March 28, 1947, Serial No. 737,784

4 Claims. (Cl. 9—1)

1

This invention relates to trailers, particularly as used by fishermen, and in particular includes a relatively small boat having wheels and a hitch permanently mounted thereon, wherein the wheel mounting is provided with means for actuating the wheels to either road or rowing positions.

The purpose of this invention is to provide mounting means for relatively small boats, particularly for use on small lakes or streams where motor vehicle travel is impossible, and the trailer is drawn over trails and the like by hand.

Various types of trailers have been provided for towing boats by motor vehicles, and other devices have been provided for attaching wheels, hitches and the like to boats for towing, and whereas these devices are practical for towing boats by motor vehicles to the usual resorts, they are not adapted for towing by hand when it is desired to carry the boat over trails and the like. With this thought in mind, this invention contemplates means for mounting wheels permanently on a boat with comparatively light framework, wherein the wheels may be actuated by a crank to downwardly extending position for road travel, and also to upwardly extending position when the boat is used in the water. The framework also includes a comparatively light hitch connection.

The object of this invention is, therefore, to provide means for permanently attaching a hitch and wheels to a boat, wherein the elements form a permanent part thereof.

Another object of the invention is to provide means for mounting wheels on a boat or the like wherein the wheels are actuated to upper and lower positions from the interior of the boat, so that they may be lowered for towing while the boat is in the water.

Another object of the invention is to provide means for mounting wheels and a hitch on comparatively small boats, wherein the attaching means is of comparatively light weight.

Another object of the invention is to provide means for mounting a hitch and wheels on a boat in which the wheels may be moved to positions toward the rear or stern of the boat so that they do not interfere with rowing.

A further object of the invention is to provide a combination boat and trailer wherein the elements are permanently attached, which is of a simple and economic construction.

With these and other objects in view, the invention embodies a transversely disposed horizontal shaft extending through a boat, wheels mounted in yokes fixedly attached to the outer ends of the shaft, a crank by which the shaft may be rotated to elevate or lower the wheels, a hitch, and braces extending from the hitch to the wheel-mounting yokes providing supporting means for the yokes with the wheels in the lower road-contacting position.

Other features and advantages of the invention will appear from the following description taken in connection with the drawings, wherein:

Figure 1 is a view showing a side elevation of a boat with wheels attached, wherein the wheels are illustrated in the lower or road-contacting position.

Figure 2 is a plan view of the boat illustrated in Figure 1, also showing the wheels in the lower position.

Figure 3 is a cross-section through the boat illustrated in Figure 2, taken on line 3—3 of Figure 2, showing the boat in section and the wheels and mounting means therefor in elevation.

Figure 4 is a detail taken on line 4—4 of Figure 3, illustrating a hub at the upper end of one of the yokes through which the yokes are keyed or splined to the ends of the shaft.

Referring now to the drawings, wherein like reference characters indicate corresponding parts, the combination boat and trailer of this invention include a boat 10, wheels 11 and 12, and a hitch 13.

The boat, in the design shown, is comparatively small, and is formed with a bow 14, side walls 16 and 17, and a seat 18 at the stern. The wheels 11 and 12 are carried at the outer ends of a transversely disposed horizontal shaft 19 mounted in bearings 20 and 21 in the side walls 16 and 17 of the boat. The outer ends of the shaft are provided with spacing sleeves 22 and 23 against which the hubs 24 and 25 at the upper ends of the posts 26 and 27 of the yokes 28 and 29 are mounted, as illustrated in Figure 4, wherein the hubs are provided with splines 30 that extend into grooves 31 in the ends of the shaft. The wheels 11 and 12 are rotatably mounted on shafts 32 and 33 in the lower ends of arms of the yokes 28 and 29, as illustrated in Figure 3.

The yokes are normally held in the vertical position by struts 34 and 35, the forward ends of which are attached to a bar 36 extending through a resilient block 37 at the bow of the boat on the lower surface of which the hitch 13 is mounted, as shown in Figure 1. The opposite ends of the struts 34 and 35 are provided with pins 38 that are held in eyes 39 on the forward surfaces of the yokes, as shown in Figure 1. When the wheels are elevated to the positions indicated in dotted lines, the struts are separated from the yokes and moved upward to the position indicated in dotted lines in Figure 1, wherein the pins 38 are held by projections 40 on the hubs 24 and 25 at the ends of the shaft.

The shaft 29 is provided with a centrally disposed gear 41 that normally meshes with a worm 42 on a shaft 43 which is rotatably mounted in a support 44 in the central part of the boat, and the shaft 43 is rotated by a crank 45 at the forward end thereof, as illustrated in Figure 2. By this means, the shaft 43 may be rotated by hand to actuate the worm gears for either elevating or lowering the wheels. With the wheels in the downward or road position, the worm 42 on the shaft 43 may be slid forward, wherein it is not in mesh with the gear 41 so that danger of damage to the gears from shock caused by towing the trailer is eliminated.

With the parts permanently mounted on a boat in this manner, the structural trailer-forming elements reinforce the structure of the boat and make it possible to either tow the boat by hand, or by a motor vehicle, and also make it possible to row a boat with the parts attached.

It will be understood that modifications may be made in the design or arrangement of the parts without departing from the spirit of the invention.

What is claimed is:

1. A trailer boat comprising a boat body having a prow, sidewalls, and a bottom, a transverse axle journalled through the sides of said boat body, normally depending vertical arms fixed on the outer ends of said axle outside of the sides of the boat, said arms terminating at their lower ends in ground engaging wheels arranged to support said boat body above the ground, draft means on said prow comprising a hitch and a pair of struts pivoted at their forward ends on said draft means and extending rearwardly along the outsides of said sides of said boat body, connecting means on the rear ends engageable with said arms in their normal depending vertical positions to hold the same in place, and operating means for rotating said axle with said struts disengaged from said arms for swinging said arms rearwardly and upwardly to substantially horizontal positions wherein said ground engaging wheels are elevated above said bottom of said boat body.

2. A trailer boat comprising a boat body having a prow, sidewalls, and a bottom, a transverse axle journalled through the sides of said boat body, normally depending vertical arms fixed on the outer ends of said axle outside of the sides of the boat, said arms terminating at their lower ends in ground engaging wheels arranged to support said boat body above the ground, draft means on said prow comprising a hitch and a pair of struts pivoted at their forward ends on said draft means and extending rearwardly along the outsides of said sides of said boat body, connecting means on the rear ends engageable with said arms in their normal depending vertical positions to hold the same in place, and operating means for rotating said axle with said struts disengaged from said arms for swinging said arms rearwardly and upwardly to substantially horizontal positions wherein said ground engaging wheels are elevated above said bottom of said boat body, said operating means comprising a crank operated worm supported on the bottom of said boat body beneath said axle, and a wormwheel fixed on said axle and meshed with said worm.

3. A trailer boat comprising a boat body having a prow, sidewalls, and a bottom, a transverse axle journalled through the sides of said boat body, normally depending vertical arms fixed on the outer ends of said axle outside of the sides of the boat, said arms terminating at their lower ends in ground engaging wheels arranged to support said boat body above the ground, draft means on said prow comprising a hitch and a pair of struts pivoted at their forward ends on said draft means and extending rearwardly along the outsides of said sides of said boat body, connecting means on the rear ends engageable with said arms in their normal depending vertical positions to hold the same in place, and operating means for rotating said axle with said struts disengaged from said arms for swinging said arms rearwardly and upwardly to substantially horizontal positions wherein said ground engaging wheels are elevated above said bottom of said boat body, retaining means on the sides of said boat body for engagement with the rear ends of said struts while said struts are disconnected from said arms and said arms are in rearwardly elevated position, for retaining said struts in elevated substantially horizontal positions along the outsides of said boat body sides.

4. A trailer boat comprising a boat body having a prow, sidewalls, and a bottom, a transverse axle journalled through the sides of said boat body, normally depending vertical arms fixed on the outer ends of said axle outside of the sides of the boat, said arms terminating at their lower ends in ground engaging wheels arranged to support said boat body above the ground, draft means on said prow comprising a hitch and a pair of struts pivoted at their forward ends on said draft means and extending rearwardly along the outsides of said sides of said boat body, connecting means on the rear ends engageable with said arms in their normal depending vertical positions to hold the same in place, and operating means for rotating said axle with said struts disengaged from said arms for swinging said arms rearwardly and upwardly to substantially horizontal positions wherein said ground engaging wheels are elevated above said bottom of said boat body, the upper ends of said arms having lugs with which said connecting means on the rear ends of said struts are engageable while said arms are in a rearwardly elevated horizontal position whereby said struts are maintained in elevated generally horizontal positions along the outsides of said boat body sides and said arms are prevented from subsiding from their reawardly elevated positions.

LUTHER A. HOLMES.

REFERENCES CITED

The following references are of record in the file of this patent:

UNITED STATES PATENTS

| Number | Name | Date |
| --- | --- | --- |
| 1,691,633 | Bertram | Nov. 13, 1928 |

FOREIGN PATENTS

| Number | Country | Date |
| --- | --- | --- |
| 739,678 | France | Jan. 16, 1933 |